(12) United States Patent
Jain et al.

(10) Patent No.: US 8,732,571 B2
(45) Date of Patent: May 20, 2014

(54) METHODS AND SYSTEMS FOR GENERATING AND DISPLAYING A PREVIEW IMAGE OF A CONTENT AREA

(75) Inventors: Arvind Jain, Sunnyvale, CA (US); Sreeram Ramachandran, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/077,311

(22) Filed: Mar. 31, 2011

(65) Prior Publication Data

US 2012/0254721 A1    Oct. 4, 2012

(51) Int. Cl.
*G06F 17/20* (2006.01)

(52) U.S. Cl.
USPC ............................................. 715/234

(58) Field of Classification Search
USPC ............................................. 715/234
See application file for complete search history.

(56) References Cited

U.S. PATENT DOCUMENTS

| | | | | |
|---|---|---|---|---|
| 5,931,904 | A * | 8/1999 | Banga et al. | 709/217 |
| 6,240,447 | B1 * | 5/2001 | Banga et al. | 709/217 |
| 6,532,493 | B1 * | 3/2003 | Aviani et al. | 709/224 |
| 6,643,641 | B1 * | 11/2003 | Snyder | 707/709 |
| 6,704,024 | B2 * | 3/2004 | Robotham et al. | 345/581 |
| 6,785,769 | B1 * | 8/2004 | Jacobs et al. | 711/118 |
| 7,242,406 | B2 * | 7/2007 | Robotham et al. | 345/581 |
| 7,688,327 | B2 * | 3/2010 | Robotham et al. | 345/581 |
| 7,823,083 | B2 * | 10/2010 | Rohrabaugh et al. | 715/815 |
| 7,831,926 | B2 * | 11/2010 | Rohrabaugh et al. | 715/800 |
| 7,864,186 | B2 * | 1/2011 | Robotham et al. | 345/581 |
| RE42,413 | E * | 5/2011 | Snyder | 707/802 |
| 8,332,284 | B1 * | 12/2012 | Runo et al. | 705/27.2 |
| 2002/0015042 | A1 * | 2/2002 | Robotham et al. | 345/581 |
| 2003/0177444 | A1 * | 9/2003 | Sunata | 715/513 |
| 2003/0177445 | A1 * | 9/2003 | Sunata | 715/513 |
| 2004/0143627 | A1 * | 7/2004 | Dietl | 709/203 |
| 2004/0239681 | A1 * | 12/2004 | Robotham et al. | 345/581 |

(Continued)

FOREIGN PATENT DOCUMENTS

| | | |
|---|---|---|
| JP | 2004013345 A | 1/2004 |
| WO | WO 02/05108 A2 | 1/2002 |
| WO | WO 2008/044821 A2 | 4/2008 |

OTHER PUBLICATIONS

Bjork et al., West: A Web Browser for Small Terminals, Proceedings of UIST '99, ACM CHI Letters vol. 1 No. 1, 1999, p. 187-196.*

(Continued)

*Primary Examiner* — Frank D Mills
(74) *Attorney, Agent, or Firm* — Sterne, Kessler, Goldstein & Fox P.L.L.C.

(57) ABSTRACT

Systems, methods and articles of manufacture for generating and displaying a preview image of a content area are described herein. An embodiment includes rendering an image representing the content area requested by a browser, providing the rendered image to the browser for display, and enabling the browser to display the requested content area in place of the rendered image when the content area is received by the browser. The method further includes updating language defining the requested content area to reference the rendered image and to enable transition from a display of the rendered image to a display of the requested content area, and providing the updated language to the browser to enable the browser to display the rendered image while the requested content area is being provided to the browser.

23 Claims, 6 Drawing Sheets

(56) References Cited

U.S. PATENT DOCUMENTS

| | | | |
|---|---|---|---|
| 2006/0059462 A1* | 3/2006 | Yamamoto | 717/115 |
| 2007/0150556 A1* | 6/2007 | Fukuda et al. | 709/219 |
| 2007/0256003 A1* | 11/2007 | Wagoner et al. | 715/501.1 |
| 2007/0263007 A1* | 11/2007 | Robotham et al. | 345/581 |
| 2007/0288841 A1* | 12/2007 | Rohrabaugh et al. | 715/513 |
| 2007/0288855 A1* | 12/2007 | Rohrabaugh et al. | 715/760 |
| 2007/0294333 A1* | 12/2007 | Yang et al. | 709/203 |
| 2008/0065980 A1* | 3/2008 | Hedbor | 715/234 |
| 2009/0089448 A1* | 4/2009 | Sze et al. | 709/231 |
| 2009/0100356 A1 | 4/2009 | Kujda | |
| 2009/0228782 A1* | 9/2009 | Fraser | 715/234 |
| 2009/0259935 A1* | 10/2009 | Kramer et al. | 715/234 |
| 2009/0307571 A1* | 12/2009 | Gowda et al. | 715/202 |
| 2009/0307603 A1* | 12/2009 | Gowda et al. | 715/749 |
| 2010/0194753 A1* | 8/2010 | Robotham et al. | 345/428 |
| 2010/0202010 A1* | 8/2010 | Xiao | 358/1.15 |
| 2010/0205523 A1* | 8/2010 | Lehota et al. | 715/235 |
| 2010/0312822 A1* | 12/2010 | Howell et al. | 709/203 |
| 2011/0022984 A1* | 1/2011 | Van Der Meulen et al. | 715/830 |
| 2011/0093565 A1* | 4/2011 | Bacus et al. | 709/219 |
| 2011/0153799 A1* | 6/2011 | Ito | 709/223 |
| 2011/0173188 A1 | 7/2011 | Walsh et al. | |
| 2011/0173569 A1* | 7/2011 | Howes et al. | 715/835 |
| 2011/0197126 A1* | 8/2011 | Arastafar | 715/243 |
| 2011/0202847 A1* | 8/2011 | Dimitrov | 715/738 |
| 2011/0307785 A1* | 12/2011 | Demarta et al. | 715/719 |

OTHER PUBLICATIONS

Artail et al., Device-Aware Desktop Web Page Transformation for Rendering on Handhelds, Springer-Verlag London Limited, Personal and Ubiquitous Computing vol. 9 Iss.6, Nov. 2005, p. 368-380.*

Cohen et al., Refreshment Policies for Web Content Caches, 2002 Computer Networks vol. 38, Elsevier Science B.V., p. 795-808.*

Innovation Patent Examination Report No. 2 for Australian Patent Application No. 2011101576, mailed Aug. 21, 2012, 2 pages, Australian Patent Office, Australia.

"FLV Playback Runtime Poster/Preview Image", Adobe.com, 1 page, accessed at http://web.archive.org/web/20090609101643/http://forums.adobe.com/message/197624 on Apr. 26, 2012.

Michael Hurwicz, "Introduction to ActionScript for Flash Video/Creating & Loading a Preview Image pt 1", VTC.com, 3 pages, accessed at http://www.vtc.com/products/AdobeFlashCS4Video/IntroductionActionScriptfor FlashVideo/80338 accessed on Apr. 26, 2012.

International Search Report for Dutch Patent Application No. 2007905, mailed Jun. 13, 2012, 9 pages, Netherland Patent Office, Netherlands.

* cited by examiner

METHODS AND SYSTEMS FOR GENERATING AND DISPLAYING A PREVIEW IMAGE OF A CONTENT AREA

BACKGROUND

1. Field

Embodiments generally relate to browsers, and particularly to display of content in browsers.

2. Background Art

Display of a web page by a browser involves several processing steps. These steps generally include parsing the web page, fetching referenced embedded resources, executing scripts, laying out and rendering web page elements and so on, until the web page is fully rendered for display. The process of rendering a page can be slow, requiring several iterative steps by the browser.

To provide increasingly interactive content, web pages incorporate more scripts, widgets, and reference more third-party content (e.g., advertisements). In other words, web pages are becoming more complex. As a result, users often have to wait for a longer time for web pages to render and display in their entirety.

BRIEF SUMMARY

Embodiments for generating and displaying a preview image of a content area are described herein. An embodiment includes rendering an image representing the content area requested by a browser, providing the rendered image to the browser for display, and enabling the browser to display the requested content area in place of the rendered image when the content area is received by the browser. The method further includes updating language defining the requested content area to reference the rendered image and to enable transition from a display of the rendered image to a display of the requested content area, and providing the updated language to the browser to enable the browser to display the rendered image while the requested content area is being provided to the browser.

In this way, embodiments reduce a perceived time-to-display of a requested content area by displaying a preview image of the content area prior to displaying the content area.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments for generating and displaying a preview image of a content area are described herein. Embodiments enable a server to render a preview image of the content area (e.g., web-page) requested by a browser. The preview image can be displayed by the browser prior to receiving the requested content area from the server. An embodiment includes receiving a request for a content area from the browser, rendering an image representing the requested content area, providing the rendered image to the browser for display, and enabling the browser to display the requested content area in place of the rendered image when the content area is received by the browser. In this way, embodiments reduce a perceived time-to-display of a requested content area by displaying a preview image of the content area prior to displaying the content area.

While illustrative embodiments described herein with reference to particular applications, it should be understood that the embodiments are not limited thereto. Those skilled in the art with access to the teachings provided herein will recognize additional modifications and applications within the scope thereof and additional fields in which the embodiments would be of significant utility.

The term "content area" used herein refers to an area of an user interface display that can display content addressed by an address, such as, a uniform resource locator (URL) or a file name. For example, addressed content may include any content stored on local storage media (e.g., hard disk drive(s)) or any networked or web content. As an illustrative example, content displayed in the content area may include, for example, a web page, application, document, video, multimedia content, future utilized content mechanism, or any combination thereof. These examples are illustrative and are not intended to limit the definition.

System

Figure 1:
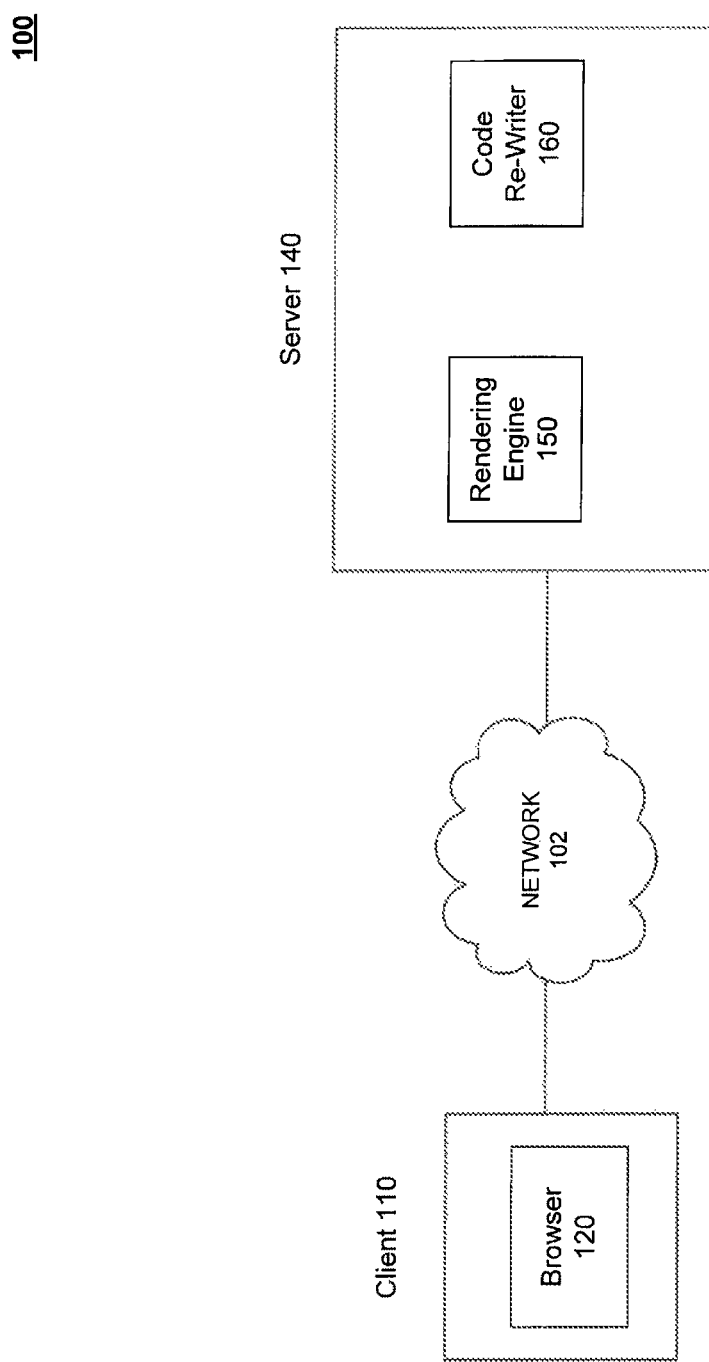
FIG. 1 illustrates a system for generating and displaying a preview image of a content area, according to an embodiment.

This section describes a system for generating and displaying a preview image of a content area, according to an embodiment illustrated in FIG. 1. FIG. 1 is a diagram of system 100 for generating and displaying a preview image of a content area, according to an embodiment. While the following is described in terms of Hyper Text Markup Language (HTML), the embodiments are not limited to. HTML and can be applied to any other markup, formatting, content defining language. Furthermore, the embodiments are not limited to web or networked content and can be applied to any type of locally stored content (e.g., content stored on a local storage media). The embodiments are applicable to any system having generally the structure of FIG. 1, or that would benefit from the operation, methods and functions as described herein.

System 100 includes client 110 and server 140 connected over network 102. In an embodiment, client 110 includes browser 120. User 108 can interact with client 110 to provide data to client 110 and receive (or view) data from client 110.

In an embodiment, server 140 provides content to client 110 in response to requests from client 110. Such requests may be generated by browser 120 in client 110. In another non-limiting example, server 140 provides (or 'pushes') content to client 110 without requests from client 110. Content provided by server 140 may include, but is not limited to, a web page, application, document, video, multimedia content, future utilized content mechanism, or any combination thereof. These examples are illustrative and are not intended to limit the embodiments.

In an embodiment, content provided by server 140 to client 110 is displayed on a display (not shown) of client 110. A user may interact with content displayed on client 110 that may cause client 110 to request additional content from server 140.

Server 140 can be any type of processing (or computing) device having one or more processors. For example, server 140 can be a workstation, mobile device (such as a mobile phone tablet or laptop), computer, cluster of computers, set-top box, embedded system, console, or other device having at least one processor. Such a processing device may include software, firmware, hardware, or a combination thereof. Software may include one or more applications and an operating system. Hardware can include, but is not limited to, a processor, memory and graphical user interface display. As shown in FIG. 1, server 140 includes rendering engine 150 and code re-writer 160, the operations of which are discussed further below.

Network 102 may include one or more networks, including but not limited to, a local area network, medium-area network, and/or wide-area network, such as the Internet. Network 102, for example, may be any form of wired or wireless network that allows client 110, server 140, and any additional clients and servers to communicate with each other.

Client 110 can be any type of processing (or computing) device having one or more processors. For example, client 110 can be a workstation, mobile device (such as a mobile phone tablet or laptop), computer, cluster of computers, set-top box, embedded system, console, or other device having at least one processor. Such a processing device may include software, firmware, hardware, or a combination thereof. Software may include one or more applications and an operating system. Hardware can include, but is not limited to, a processor, memory and graphical user interface display. As shown in FIG. 1, client 110 includes browser 120. Browser 120 can be any type of browser that enables a user to browse locally stored as well as web content.

Figure 2:
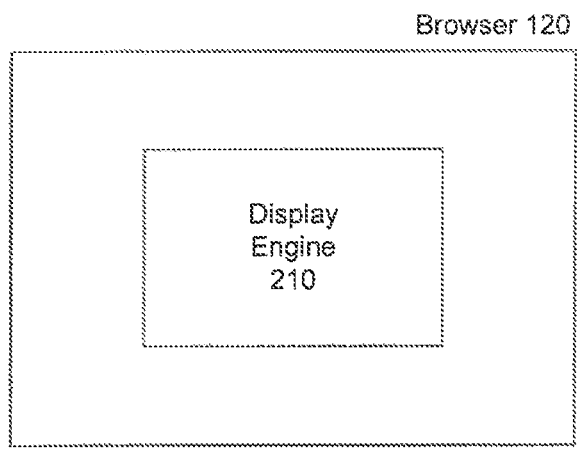
FIG. 2 illustrates a browser, according to an embodiment.

FIG. 2 illustrates browser 120 in greater detail, according to an embodiment. As shown in FIG. 2, browser 120 includes display engine 210. In an embodiment, display engine 210 is configured to display a rendered preview image provided by server 140.

Rendering Engine 150

In an embodiment, rendering engine 150 in server 140 is configured to render an image representing a content area requested by browser 120. As an example, server 140 may receive a request for a web page from browser 120. Also, for example, content in the requested web page may include, but is not limited to, an application, document, video, multimedia content, scripts, widgets, etc.

In an embodiment, when a request for a content area is received from browser 120, rendering engine 150 parses and renders the content area. In an embodiment, to render an image representing the requested content area, rendering engine 150 performs rendering actions that are conventionally performed by a browser including, but not limited to, storing and sending cookies, executing scripts, fetching referenced resources, applying fonts, colors, backgrounds and other styles, etc. In this way, rendering engine 150 generates a preview image of a content area requested by browser 120.

Rendering engine 150 may store the rendered preview image on storage in server 140 or can even store the rendered preview image on a storage that is separate from server 140. In an embodiment, server 140 is further configured to dynamically select a rendering engine or a cached preview image based on a header (e.g., user agent header) sent by browser 120.

In an embodiment, rendering engine 150 can pre-render preview images representing one or more content areas and cache the rendered preview images prior to receiving a request for the content areas from browser 120. In an embodiment, browser 120 or even server 140 may select content (e.g., web pages) to be pre-rendered based on their popularity, personalization or value to a user, etc. In an embodiment, such a cache or repository storing the pre-rendered images may be refreshed periodically by server 140.

In another embodiment, a proxy (not shown) connected to browser 120 and server 140 via network 102, may render and/or provide rendered preview images to browser 120 for display. The proxy may take into account factors such as origin of the embedded resources, and whether those resources are already present in the proxy's cache, etc., before deciding to use a cached preview image.

Code Re-Writer 160

In an embodiment, when server 140 receives a request for a content area from browser 120, server 140 generates mark-up language representing the requested content area. As an example, server 140 constructs HTML for the requested content area, but instead of serving the constructed HTML directly to browser 120, server 140 parses and renders a preview image of the content area for display by browser 120. In an embodiment, when a rendered preview image is generated by rendering engine 150, code re-writer 160 rewrites the constructed HTML so that the re-written HTML includes a reference to the rendered preview image. As an example, such a reference may be a file path or uniform resource locator (URL) to a storage location that stores the rendered preview image. In addition, the re-written HTML, includes code that enables browser 120 to download the requested content area in the background, while browser 120 is displaying a rendered preview image, and to switch (or transition) from the displayed preview image to the requested content area, seamlessly, when the requested content area has been fully retrieved by browser 120.

In an embodiment, browser 120 can be instructed to by server 140 to switch from a display of a preview image to the requested content area (e.g., web page) upon a user-action, such as mouse or touch interaction. Such interaction with a preview image can indicate a desire on part of the user to interact with the requested content area, at which point, switching from display of the preview image to the requested content area is helpful.

In another non-limiting embodiment, browser 120 provides an explicit request for a rendered preview image of a requested content area. Browser 120 displays the rendered preview image to a user while the requested content area is being fully retrieved by browser 120. When the requested content area is received by browser 120, browser 120 transitions display from the rendered preview image to the received content area. In this way, because browser 120 is pre-configured to perform the transition, HTML code that enables browser to perform the transition (using JavaScript or other Document Object Model (DOM) manipulation) need not be provided by server 140 to browser 120. This could also allow browser 120 to request a preview image from a different source (e.g., trusted cache, proxy or referrer) other than server 140. In an embodiment, such operation of browser 120 can be supported by extending current HTML standards.

In an embodiment, instead of rendering a preview image and then re-writing the HTML of the content area, code re-writer 160 can rewrite the HTML to reference the preview image and serve the updated HTML to the browser. Rendering engine 150 can render the preview image in parallel. Such operation can give more time to rendering engine 150 to render the preview image, while waiting for browser 120 to make a separate request for the preview image. In another embodiment, code re-writer 160 can embed the preview image directly in the rewritten HTML page. As an example, code re-writer 160 can embed the preview image directly in the rewritten HTML page using the "data:" uniform resource identifier (URI) scheme.

Methods

Figure 3A:
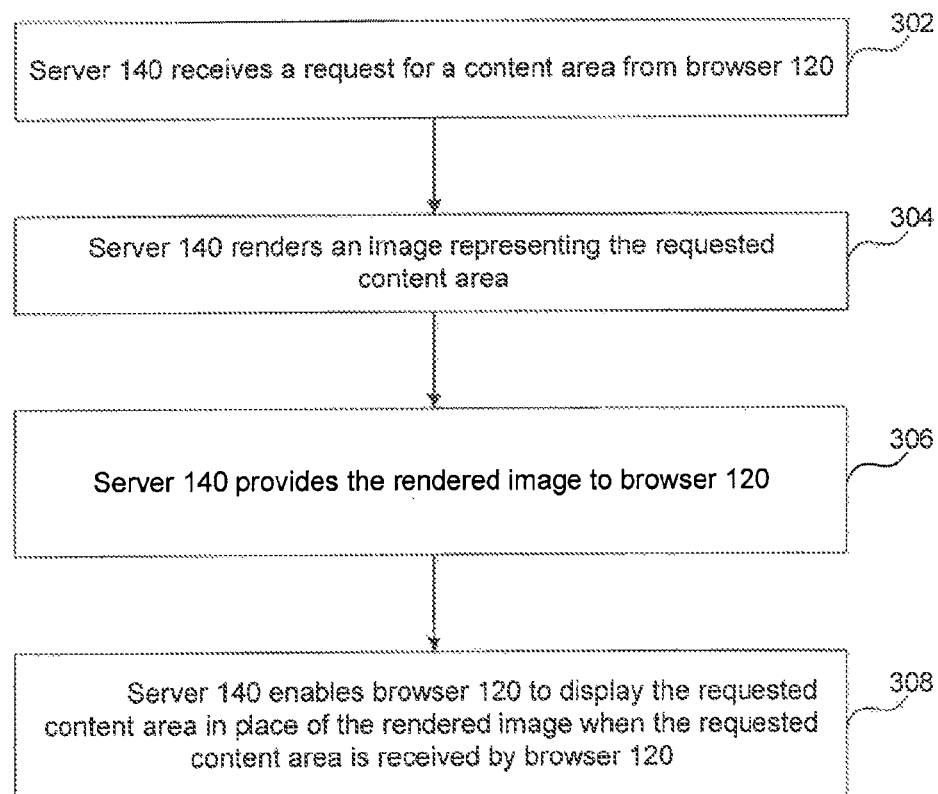
FIG. 3A is a flowchart illustrating an operation of a server, according to an embodiment.

An exemplary overall operation of server 140 will now be described with reference to FIG. 3A. FIG. 3A is a flowchart of method 300.

Method 300 begins with server 140 receiving a request for a content area from browser 120 (step 302). As an example, server 140 may receive a request for a web page from browser 120. Such a web page can be, for example, initially requested by a user interacting with browser 120. Also, for example, content in the requested web page can include, but is not limited to, an application, document, video, multimedia content, scripts, widgets, etc.

Server 140 renders a preview image representing the content area requested in step 302 (step 304). As an example, server 140 constructs HTML for the requested web page, but instead of serving the HTML directly to browser 120, server 140 parses and renders the web page itself. In an embodiment, to render a preview image representing the requested content, rendering engine 150 performs actions that are generally performed by a browser including, but not limited to, storing and sending cookies, executing scripts, fetching referenced resources, applying fonts, colors, backgrounds and other styles, etc.

Server 140 then provides the rendered preview image (or a reference to the rendered image) to browser 120 (step 306) and also enables browser 120 to display the requested content area in place of the rendered preview image when the requested content area is received by browser 120 (step 308). As an example, code re-writer 160 rewrites the HTML of the web page so that the HTML includes a reference to the rendered preview image. In another example, code re-writer 160 can embed the preview image directly in the re-written HTML page using the "data:" uniform resource identifier (URI) scheme.

Figure 3B:
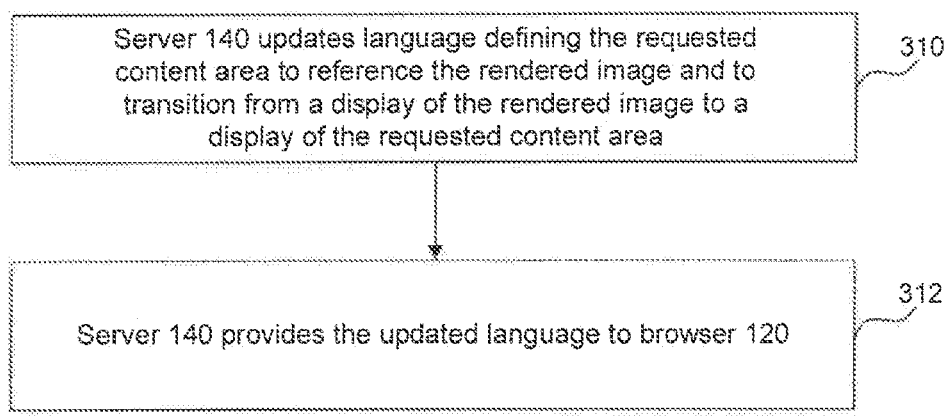
FIG. 3B is a flowchart illustrating enablement of a browser to display a preview image, according to an embodiment.

FIG. 3B is a flowchart illustrating step 308 of method 300 in greater detail, according to an embodiment.

Code re-writer 160 updates language defining the requested content area to reference the rendered image and to transition from a display of the rendered image to a display of the requested content area (step 310). As an example, and as discussed above code re-writer 160 rewrites the HTML of the requested web page so that the HTML includes a reference to a rendered preview image. As an example, such a reference may be a file path or a URL to a storage location that stores the rendered preview image.

Server 140 provides the updated language to browser 120 (step 312). As an example, HTML re-written by code re-writer 160 includes code that enables browser 120 to retrieve the requested content area in the background, while browser 120 is displaying a rendered preview image, and to switch (or transition) from the displayed preview image to the requested content area, seamlessly, when the requested content area has been fully retrieved by browser 120 from server 140.

Figure 4:
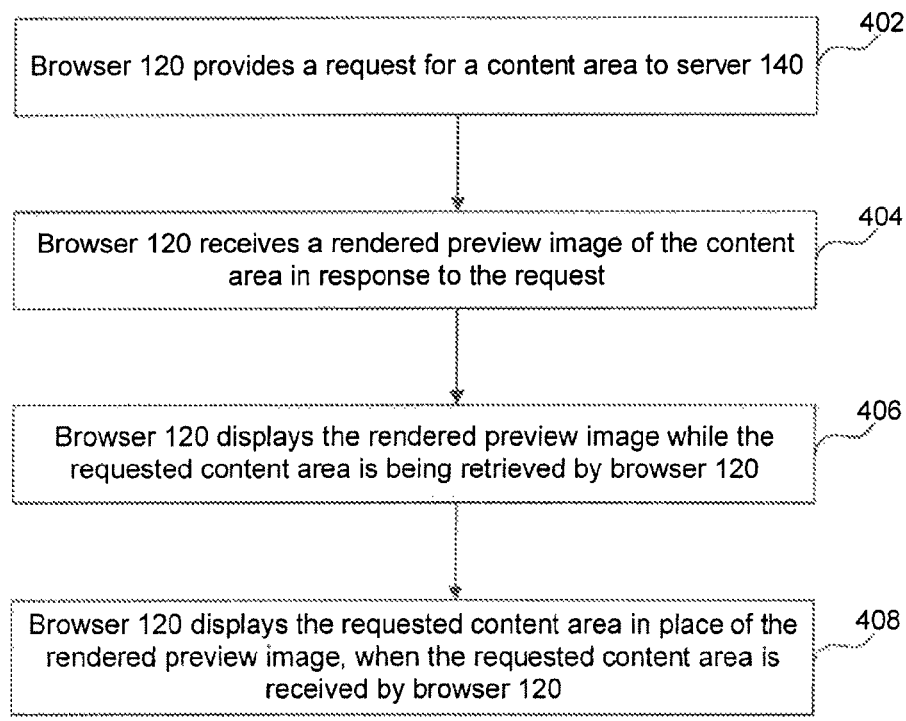
FIG. 4 is a flowchart illustrating an operation of a browser, according to an embodiment.

FIG. 4 is a is a flowchart of method 400, which is an overall operation of browser 120, according to an embodiment.

Browser 120 provides a request for a content area to server 140 (step 402). As an example, browser 120 may provide a request for a web page to server 140. Also, for example, content in the requested web page may include, but is not limited to, an application, document, video, multimedia content, scripts, widgets, etc.

In response to the request of step 402, browser 120 receives a rendered preview image (or a reference to a rendered preview image) from server 140 (step 404). Furthermore, for example, browser 120 also receives re-written HTML that enables browser 120 to transition from a display of the rendered image to a display of the requested content area.

Browser 120 displays the rendered preview image while the requested content area is being retrieved by browser 120 from server 140 (step 406) and browser 120 displays the requested content area in place of the rendered image, when the requested content area is retrieved by browser 120 (step 408). As an example, display engine 210 in browser 120 is configured to display the rendered preview image while the requested content area is being received by browser 120, and display the content area in place of the rendered preview image when the requested content area is received by the browser 120.

In this way, embodiments reduce a perceived load time of a requested content area by displaying a preview image of the content area prior to displaying the content area.

Example Computer Embodiment

Figure 5:
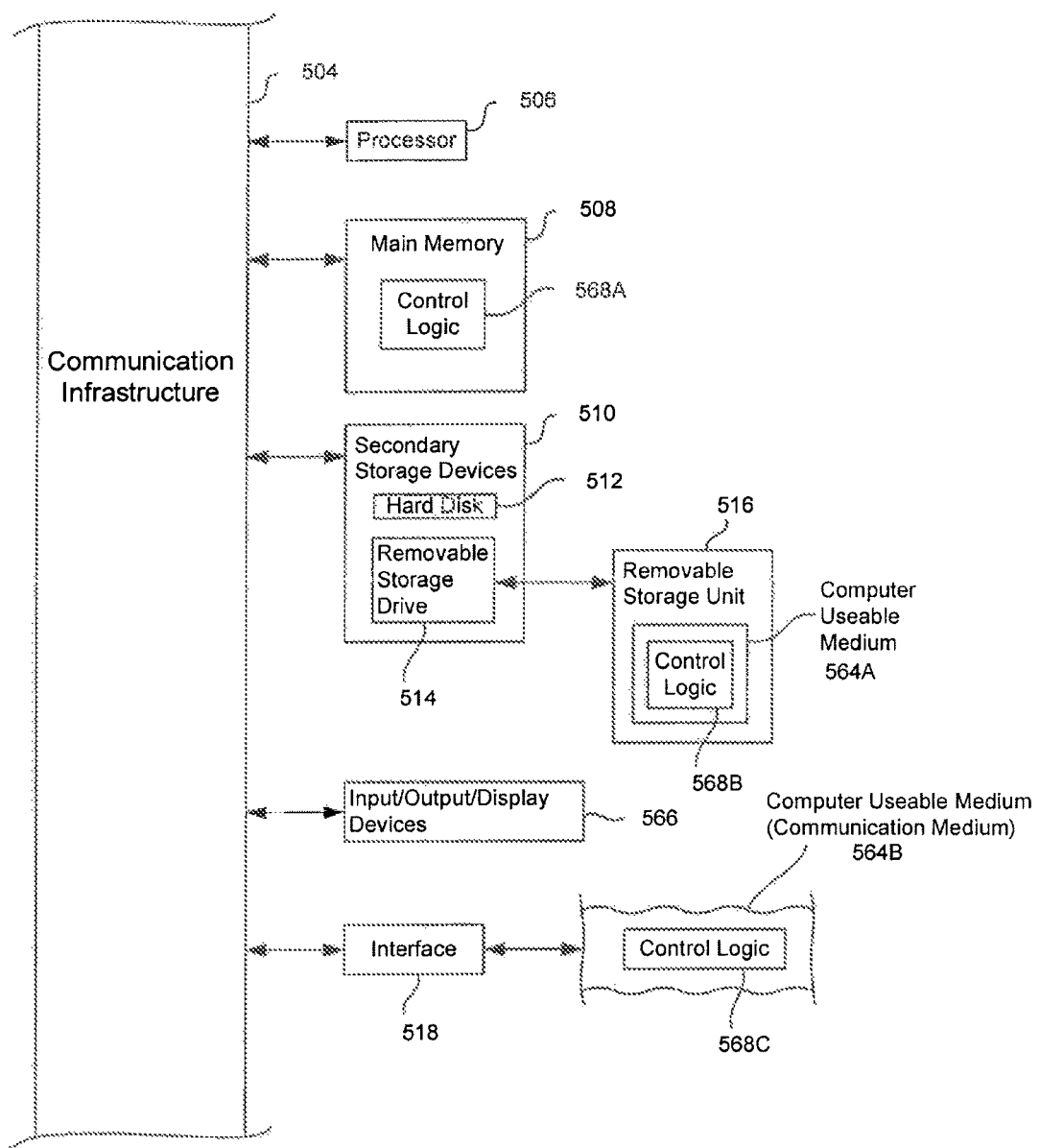
FIG. 5 illustrates an example computer useful for implementing components of the embodiments.

In an embodiment, the system and components of embodiments described herein are implemented using one or more computers, such as example computer 502 shown in FIG. 5. For example, client 110 and server 140 can be implemented using computer(s) 502.

Computer 502 can be any commercially available and well known computer capable of performing the functions described herein, such as computers available from International Business Machines, Apple, Oracle, HP, Dell, Cray, etc.

Computer 502 includes one or more processors (also called central processing units, or CPUs), such as a processor 506. Processor 506 is connected to a communication infrastructure 504.

Computer 502 also includes a main or primary memory 508, such as random access memory (RAM). Primary memory 508 has stored therein control logic 568A (computer software), and data.

Computer 502 also includes one or more secondary storage devices 510. Secondary storage devices 510 include, for example, a hard disk drive 512 and/or a removable storage device or drive 514, as well as other types of storage devices, such as memory cards and memory sticks. Removable storage drive 514 represents a floppy disk drive, a magnetic tape drive, a compact disk drive, an optical storage device, tape backup, etc.

Removable storage drive 514 interacts with a removable storage unit 516. Removable storage unit 516 includes a computer useable or readable storage medium 564A having stored therein computer software 568B (control logic) and/or data. Removable storage unit 516 represents a floppy disk, magnetic tape, compact disk, DVD, optical storage disk, or any other computer data storage device. Removable storage drive 514 reads from and/or writes to removable storage unit 516 in a well known manner, Computer 502 also includes input/output/display devices 566, such as monitors, keyboards, pointing devices, Bluetooth devices, etc.

Computer 502 further includes a communication or network interface 518. Network interface 518 enables computer 502 to communicate with remote devices. For example, network interface 518 allows computer 502 to communicate over communication networks or mediums 564B (representing a form of a computer useable or readable medium), such as LANs. WANs, the Internet, etc. Network interface 518 may interface with remote sites or networks via wired or wireless connections.

Control logic 568C may be transmitted to and from computer 502 via communication medium 564B.

Any tangible apparatus or article of manufacture comprising a computer useable or readable medium having control logic (software) stored therein is referred to heroin as a computer program product or program storage device. This includes, but is not limited to, computer 502, main memory 508, secondary storage devices 510 and removable storage unit 516. Such computer program products, having control logic stored therein that, when executed by one or more data processing devices, cause such data processing devices to operate as described herein, represent the embodiments.

Embodiments can work with software, hardware, and/or operating system implementations other than those described herein, Any software, hardware, and operating system implementations suitable for performing the functions described herein can be used. Embodiments are applicable to both a client and to a server or a combination of both, The Summary and Abstract sections may set forth one or more but not all exemplary embodiments as contemplated by the inventor(s), and thus, are not intended to limit the present description and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal their general nature that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A computer implemented method for generating a preview image of a content area, comprising:
   rendering an image representing the content area requested by a browser;
   dynamically selecting a cached preview image representing the content area based on user agent information in a header of a request for the content area;
   providing the rendered image to the browser; and
   enabling the browser to display the requested content area in place of the rendered image upon detection of an intent to interact with the rendered image when the requested content area is received by the browser, wherein the enabling includes updating language defining the requested content area to (1) reference the rendered image and (2) enable seamless transition from a display of the rendered image to a display of the requested content area,
   wherein the rendering, the providing and the enabling are performed using one or more processors.

2. The method of claim 1, the enabling further comprising:
   providing the updated language to the browser to enable the browser to display the rendered image while the requested content area is being provided to the browser.

3. The method of claim 1, further comprising:
   storing the rendered preview image of the requested content area in a cache.

4. The method of claim 1, further comprising:
   executing scripts associated with the requested content area;
   fetching resources associated with the requested content area;
   processing cookies associated with the requested content area; and
   applying graphical user interface elements to construct the requested content area.

5. The method of claim 1, further comprising:
   receiving a request from the browser to enable selection of a rendering engine to render the image.

6. The method of claim 1, further comprising:
   rendering images representing a plurality of pre-defined content areas prior to receiving requests from the browser;
   caching the plurality of rendered images; and
   providing the cached rendered images in response to requests from the browser for the pre-defined content areas.

7. The method of claim 6, further comprising updating the cached rendered images based on updates to the pre-defined content areas.

8. The method of claim 6, wherein the rendering is based on one or more of a popularity of the pre-defined content areas and relevance of the pre-defined content areas to a requesting user.

9. The computer implemented method of claim 1, the updated language comprising one or more instructions to the browser to transition from the display of the rendered image to the display of the requested content area using Document Object Model (DOM) manipulation.

10. The computer implemented method of claim 1, the updated language comprising one or more instructions to the browser to transition from the display of the rendered image to the display of the requested content area using a scripting language.

11. The computer implemented method of claim 10, wherein the scripting language is JavaScript.

12. The computer implemented method of claim 1, wherein the user agent information is in a user agent header of the request.

13. A computer implemented method for displaying a preview image of a content area in a browser, comprising:
   providing a request for the content area to a server, wherein the server dynamically selects a cached preview image representing the content area based on user agent information in a header of the request;
   receiving a rendered image representing the content area in response to the request;
   displaying the rendered image while the requested content area is being retrieved from the server; and
   displaying the requested content area in place of the rendered image upon detection of an intent to interact with the rendered image when the requested content area is received from the server which updates language defining the requested content area to (1) reference the rendered image and (2) enable seamless transition from a display of the rendered image to a display of the requested content area, wherein the providing and the displaying are performed using one or more processors.

14. A computer-based system for generating a preview image of a content area, comprising:

one or more processors;

a rendering engine configured to receive a request for the content area from a browser, render an image representing the requested content area, and dynamically select a cached preview image representing the content area based on user agent information in a header of the request;

a code re-writer configured to enable the browser to display the requested content area in place of the rendered image upon detection of an intent to interact with the rendered image when the content area is received by the browser by updating language defining the requested content area to (1) reference the rendered image and (2) enable seamless transition from a display of the rendered image to a display of the requested content area, wherein the rendering engine and the code re-writer are implemented on the one or more processors.

15. The system of claim 14, wherein the content area is a web page.

16. The system of claim 14, wherein the language is Hyper Text Mark-up Language (HTML).

17. A computer-based system for displaying a preview image of a content area, comprising:

one or more processors;

a browser configured to receive a rendered image of the content area in response to a request for the content area, wherein a server dynamically selects a cached preview image representing the content area based on user agent information in a header of the request; and a display engine configured to display the rendered image in the browser while the requested content area is being retrieved by the browser and display the content area in place of the rendered image upon detection of an intent to interact with the rendered image when the requested content area is received by the browser from a server which updates language defining the requested content area to (1) reference the rendered image and (2) enable seamless transition from a display of the rendered image to a display of the requested content area, wherein the browser and the display engine are implemented using the one or more processors.

18. An article of manufacture including a non-transitory computer-readable medium having instructions stored thereon that, when executed by a computing device, cause said computing device to perform operations comprising:

dynamically selecting a cached preview image representing the content area based on user agent information in a header of a request for the content area;

rendering an image representing a content area requested by the browser;

providing the rendered image to the browser;

enabling the browser to display the requested content area in place of the rendered image upon detection of an intent to interact with the rendered image when the requested content area is received by the browser; and updating language defining the requested content area to (1) reference the rendered image and (2) enable seamless transition from a display of the rendered image to a display of the requested content area, wherein the rendering, the providing, the enabling, and the updating are performed using one or more processors.

19. The article of manufacture of claim 18, the operations further comprising:

providing the updated language to the browser to enable the browser to display the rendered image while the requested content area is being provided to the browser.

20. The article of manufacture of claim 18, the operations further comprising:

receiving a request from the browser for a rendered preview image of the requested content area.

21. The article of manufacture of claim 18, the operations further comprising:

executing scripts associated with the requested content area;

fetching resources associated with the requested content area;

processing cookies associated with the requested content area; and applying graphical user interface elements to construct the requested content area.

22. The article of manufacture of claim 18, the operations further comprising:

receiving a request from the browser to enable selection of a rendering engine to render the image.

23. The article of manufacture of claim 18, the operations further comprising:

rendering images representing a plurality of pre-defined content areas prior to receiving requests from the browser;

caching the plurality of rendered images; and providing the cached rendered images in response to requests from the browser for the pre-defined content areas.

* * * * *